May 20, 1958  V. VACQUIER  2,835,132
GYRO VERTICALS

Filed June 4, 1952  3 Sheets-Sheet 1

INVENTOR
VICTOR VACQUIER
BY
Herbert H. Thompson
his ATTORNEY.

May 20, 1958  V. VACQUIER  2,835,132
GYRO VERTICALS

Filed June 4, 1952  3 Sheets-Sheet 2

INVENTOR
VICTOR VACQUIER
BY
Herbert H. Thompson
his ATTORNEY.

May 20, 1958  V. VACQUIER  2,835,132
GYRO VERTICALS
Filed June 4, 1952  3 Sheets-Sheet 3

INVENTOR
VICTOR VACQUIER
BY
Herbert H. Thompson
his ATTORNEY.

United States Patent Office 2,835,132
Patented May 20, 1958

2,835,132

GYRO VERTICALS

Victor Vacquier, Garden City, N. Y., assignor to Sperry Rand Corporation, a corporation of Delaware Application June 4, 1952, Serial No. 291,670

11 Claims. (Cl. 74—5.47)

This invention relates to gyro verticals of extreme accuracy adapted to be used on ships or airplanes to stabilize sights, radar antennae or guns. Such gyroscopes are at present subject to an inherent error when coerced by gravity due to rotation of the earth so that adjustment for different latitudes is required. Such gyroscopes are also subject to errors due to the course and speed of the ship over the earth's surface. Hence, it has been the practice to introduce corrections for all of these factors, settable in accordance with the latitude, speed and course of the ship. Such corrections do not now cure however the errors arising during changes of speed or course, but only after the ship has settled on its new course or speed.

One object of the present invention is to obviate the necessity for those various latitude, speed and course settings, and to avoid the temporary errors due to changing course and speed, to accomplish which I have devised a new erection arrangement in which the gyroscope is given a period of about 84 minutes, i. e., the same period as that of a pendulum whose length is equal to the radius of the earth. Such an arrangement possesses the important advantage that the gyroscope is not subject either to the errors during a change of speed and course of the ship or thereafter, since during such changes the gyro will automatically be brought to its new proper vertical by the time the ship reaches its new latitude and longitude. By this arrangement also the necessity for a latitude corrector is avoided, since the erection device itself will maintain the gyroscope vertical in any latitude and since a change of latitude cannot occur without movement of the ship and movement of the ship necessarily involves the production of acceleration and velocity terms, from which the resulting change of position of the ship may be determined. In several respects my invention may be regarded as an improvement on the artificial horizon shown in the prior patent to Esval, 2,293,039, dated August 18, 1942.

A ready determination of the amount of all movements can be made by double integration of the component of the ship's acceleration in a N.-S. and E.-W. direction with respect to time. Hence, by applying on the gyro a torque proportional to the first of such integral, the changed inclination of the gyro for the new latitude and longitude (such precession constituting the second integral) is automatically set in without error if the period is made about 84 minutes, as aforesaid. For damping purposes and for quicker erection, I also prefer to make direct use of the displacement signal from the pendulum controller to apply a proportionate torque on the gyroscope about an axis normal to tilt. I prefer to keep this torque small, however, since it is undesirable during changes of speed or course. Alternatively or in addition, I may make provision for eliminating this damping torque during changes of speed or course.

I am aware that the advantages of giving a pendulous gyro vertical or a gyro compass an 84 minute period are well recognized in the art, this period being frequently referred to as "Schuler tuning" or "the Schuler pendulum" after the inventor or discovery of this basic principle, but while such a period is relatively easy to obtain in gyro compasses, it is quite difficult to obtain in a gyro pendulum or gyro vertical, and this invention is directed in part to improvements in the construction of gyro verticals by which the desired period of 84 minutes is readily obtainable. In addition to employing an integrated signal from a pendulous controller to control torquers on a gyroscope, of the foregoing characteristics, I have virtually eliminated friction about the gimbal axes of the gyroscope by immersing the sensitive element in a liquid which supports the entire weight thereof, but without a buoyant effect, so that there is virtually no pressure due to gravity on the gimbal pivots. In addition, I prefer to rotate the gimbal about the vertical axis so that any effect of the shift of the center of gravity of the system is averaged out and also a slight erecting torque is exerted on the gyro.

Referring to the drawings.

Figure 1:
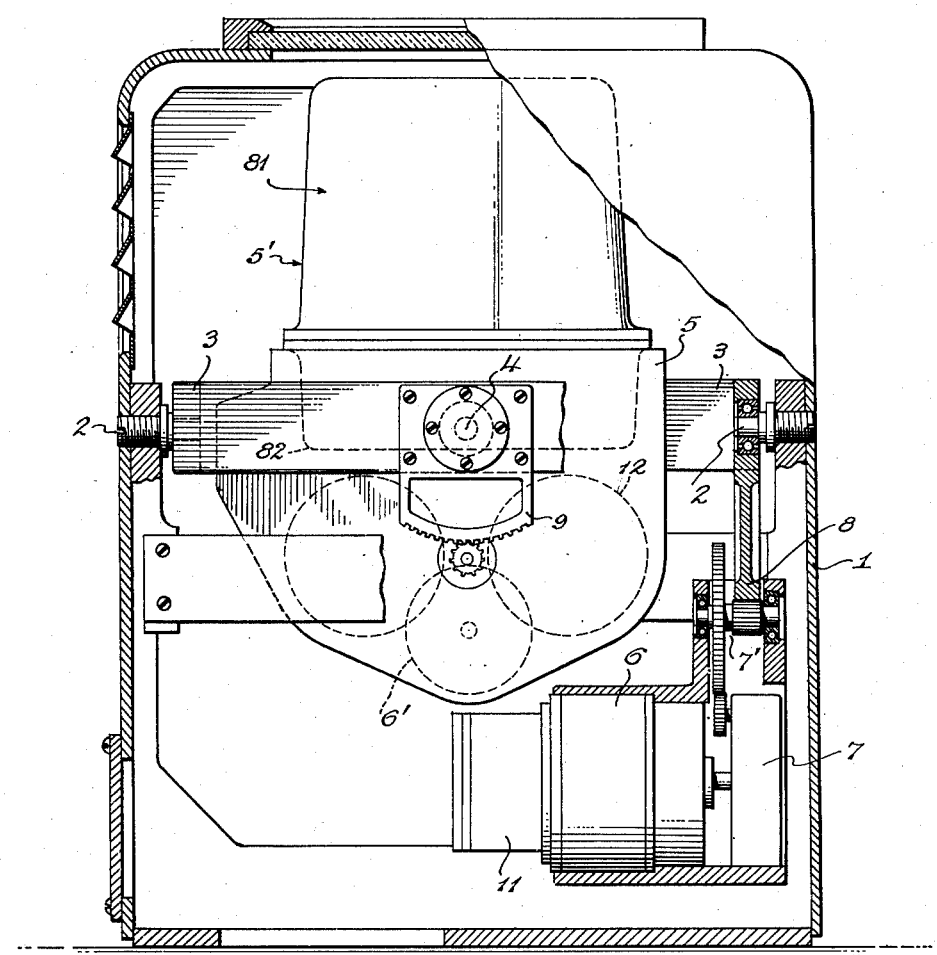
Fig. 1 is a side elevation of my improved gyro vertical, the housing and certain parts of the gyroscope being shown in section.

My improved gyro unit may be housed in an outer housing 1 secured to the ship within which a stabilized unit 5 may be universally gimballed on major axis 2, 2 and minor axis 4, 4 by means of the gimbal ring 3. Usually the major axis is placed fore and aft on the ship and hence becomes the roll axis, while the minor axis is the pitch axis. The unit or platform 5 is maintained level about its major axis by means of roll servomotor 6 in the base of the case 1 which is coupled to the gimbal ring 3 through reduction gearing 7, 7' and gear sector 8. Similarly, the platform is maintained level about minor axis 4, 4 by pitch servomotor 6' mounted in the bottom of platform 5 and geared to sector 9 secured to gimbal 3 through suitable reduction gearing.

Transmitters for transmitting the position of the platform in roll and pitch may be actuated from said servomotors, the roll transmitter being shown at 11 and the pitch transmitter at 12. Of course, it will be understood that the platform may be used directly, if desired, as a horizontal reference for guns, sights, trunnion tilt correctors, etc.

The gyro vertical unit is shown as enclosed in a case 5' having a separable top portion 81 and a bottom pan 82 which rests in the top of platform 5. The gyro proper is shown as comprising electrically spun rotor 13 of conventional design mounted on a shaft 14 in vertical bearings 15, 16 within a rotor case 17. The rotor case is preferably made in the form of a sphere completely enclosing the rotor and is journalled on a minor axis 18 within gimbal ring 19, which in turn is journalled on a major axis 20 in the housing or enclosure 10. Preferably, the housing 10 completely encloses the case 17 and the space between the two is preferably substantially completely filled with a liquid of a density such that the liquid displaced by the sphere is substantially equal in weight to that of the rotor and its housing. The gimbal ring 19 is also made of the same net density. By this means, all gimbal bearings are relieved of load and hence bearing friction reduced to a minimum.

Preferably, also to average out balancing errors and possibly give some erection torque, I continuously rotate the gimbal supporting housing 10 at a fairly slow speed. For this purpose, the housing is shown as mounted for rotation in upper and lower bearings 20' and 21' within the framework or case 5' and continuous rotation is imparted thereto by a motor 22 through worm and worm wheel 23 and pinion 24 and gear section 25 in the bottom part 82 of the case 5'.

Figure 2:
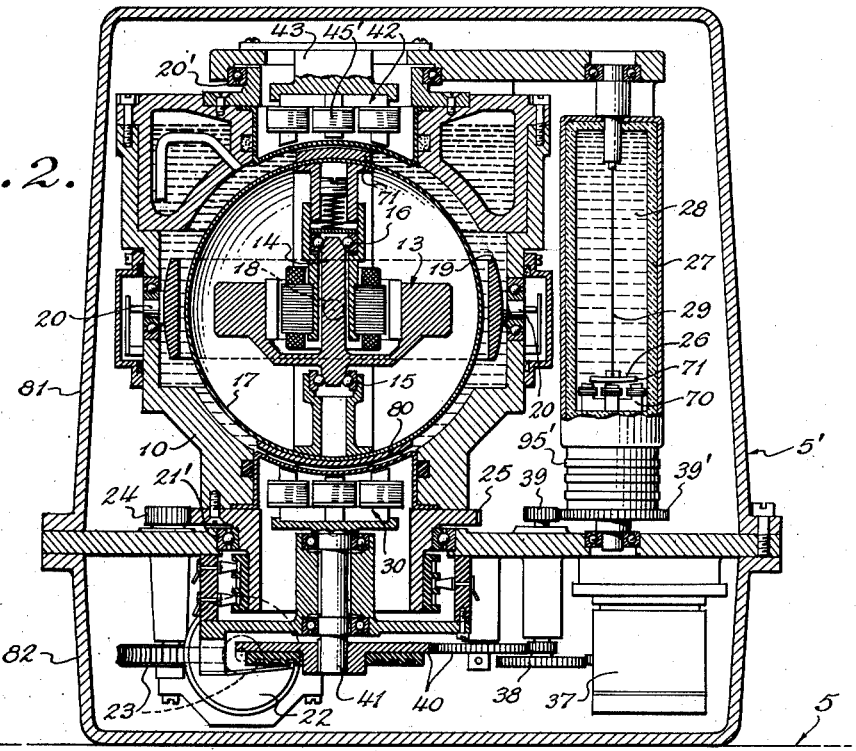
Fig. 2 is a vertical section through the gyro unit proper which constitutes the upper portion of Fig. 1 and is shown on a larger scale.
Figure 3:
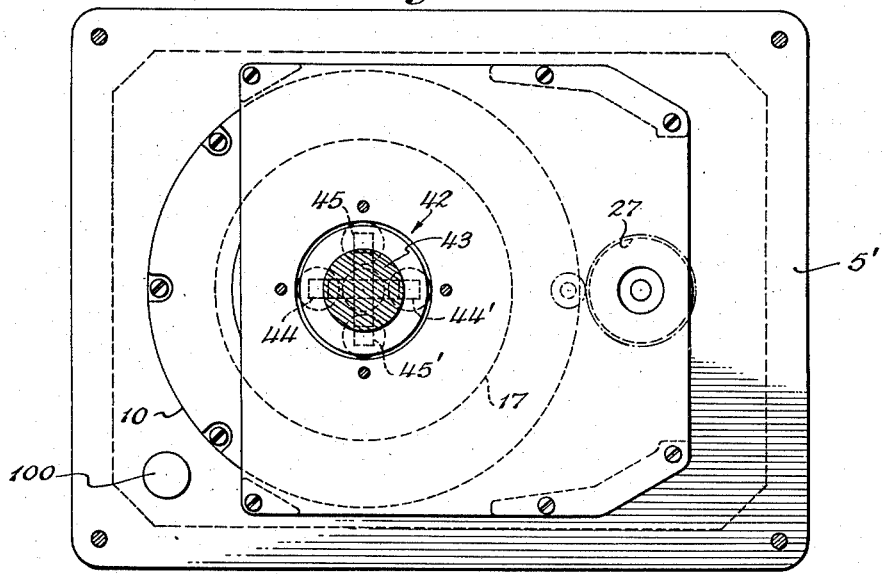
Fig. 3 is a top plan view of the gyro vertical partly in section with the cover removed.

Gravitational control of the gyroscope is preferably achieved from a gravitational controller or controllers shown as in the form of a pendulum bob 26, suspended within a tube 27 preferably containing a damping liquid 28. The bob is of greater density than the liquid and is suspended from a filar 29. The pendulum is also provided with suitable pick-offs, one responsive to relative tilt of the pendulum and its case in one fixed direction with respect to the earth, such as the E-W plane, while the other is responsive to tilt at right angles to the first plane, or in the instance given in the N-S plane. The pick-offs may be of any suitable form, such as a cruciform inductive pick-off 70 fixed to the tube and a small ferrous disc 71 on the bob which varies the reluctance between the wound center pole 72 and the individual poles of the two pairs of poles 73, 73' and 74, 74', one arranged N-S and the other E-W, the general arrangement being similar in appearance to that of pick-off 42 and torquer 30 (Figs. 2 and 3) hereinafter described, but in this case while the center pole is excited by single phase A. C., the individual windings of the pairs of outer poles act as secondary inductances and being cross-connected, give A. C. outputs which vary in magnitude with tilt in their plane and reverse in phase for opposite tilts, as well known in the art (see Wittkuhns et al. 2,093,503 dated September 21, 1937, for Artificial Horizons). The outputs of the aforementioned pick-offs actuate respective torque applying devices to apply torques to the gyro about axes respectively normal to the tilt axis. In other words, the output of the pair of poles 73, 73' which is responsive to tilt of the gyro in the plane of the paper, controls the torquing poles 32, 33 of torquer 30, while the output of the poles 74, 74' controls the torquing poles 30', 31.

Figure 5:
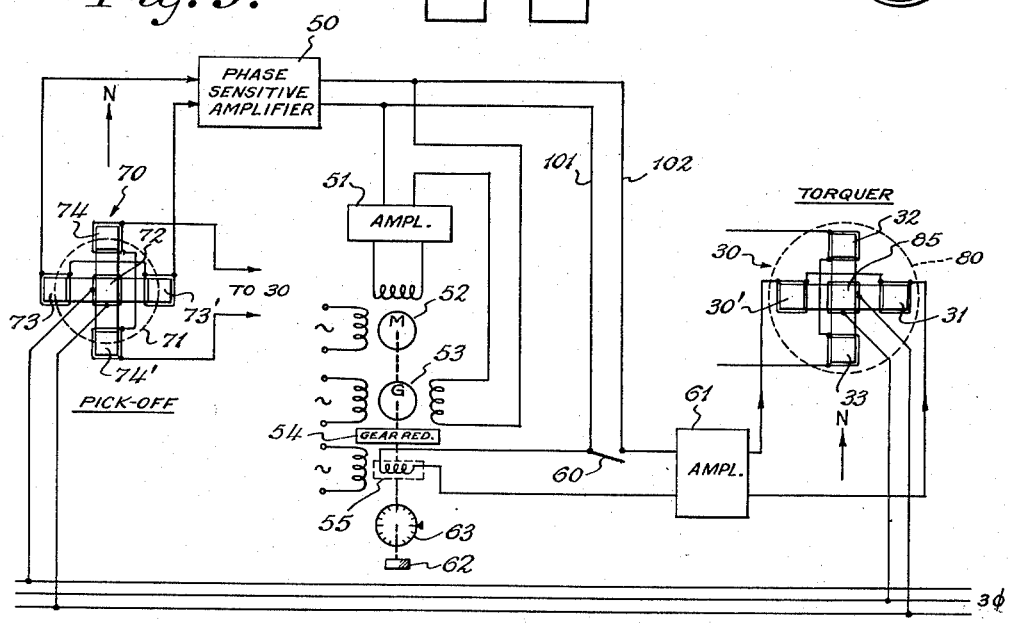
Fig. 5 is a simplified wiring diagram of one of the integrators used to integrate the movement of the pendulum representing acceleration to give the ship's velocity in direction and amount.

Said torquer is shown in the form of a cross in Fig. 5 and is closely similar in appearance to pick-off 70, in that it has a central pole 85 and four poles 30', 31, and 32, 33 symmetrically arranged about it, but the circuit arrangement is quite different in that the curved disc 80 on the gyro is large enough to overlie the poles and is made of a good conductor of both electricity and magnetism to obtain motor action and increase the magnetic flux. Preferably also, the windings on outer pairs of poles are excited from a polyphase supply out of phase with the winding on the central pole 85 to give motor action and the individual poles of each pair wound to give opposite phase excitation.

Preferably, the entire gravitational control system is maintained fixed in azimuth. This may be accomplished by mounting within the casing 5' a repeater system actuated from a ship's gyro compass 35 (Fig. 4), and comprising a repeater motor 37 geared through reduction gearing 38, 39 and 39' to orient the tube 27, within which the pendulum is mounted. Said repeater 37 also rotates through gearing 40 a shaft 41 on which the above-described cross-shaped torquer 30 is mounted, so that both the pendulum and the torquer are fixed in azimuth from the ship's gyro compass.

Figure 4:
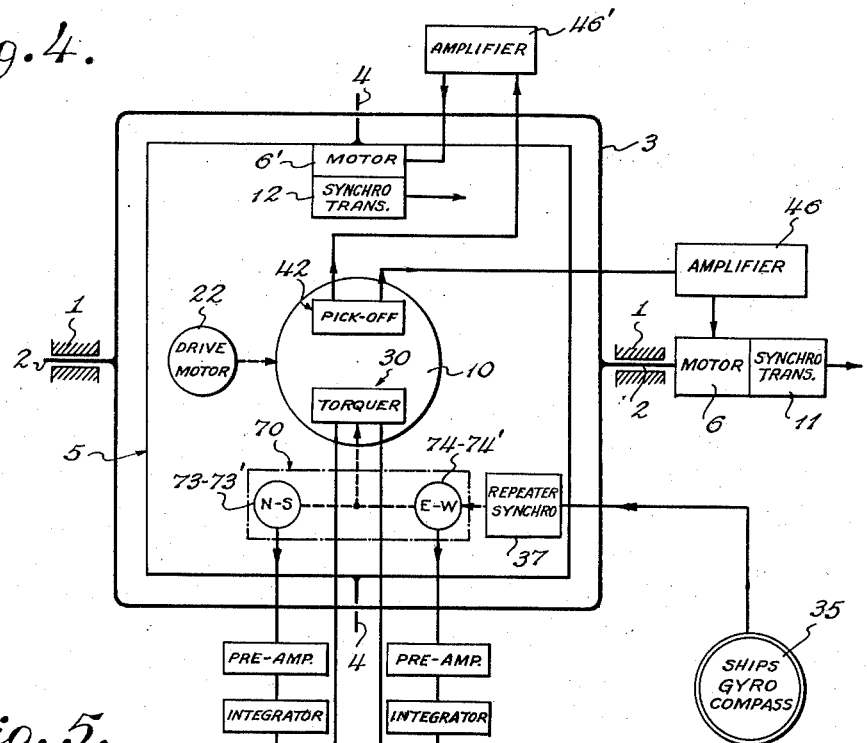
Fig. 4 is a block diagram showing the direction of energy flow in the several parts of the system.

The entire platform is stabilized from the gyro vertical preferably by a cross-shaped pick-off 42 which may be similar in appearance and function to the pick-off 70 and may likewise be provided with five poles, the central pole being supplied with single phase alternating current as before. Said pick-off is shown as supported at the top from a supporting casting 43 within the housing 5'. The two outputs from the inductive windings 44, 44' and 45, 45' on the outer poles will, therefore, be responsive to the relative tilt of the gyro and the platform about the aforesaid major and minor trunnion axes which are usually placer fore and aft and athwartship on the craft as aforesaid. The outputs of the windings 44, 44', are connected to operate the roll servomotor above described, while the output of the windings 45, 45' is connected to operate the above described pitch motor 6' through suitable phase sensitive amplifiers 46, 46' (Fig. 4).

In order to obtain a measure of the change of ship's position when it moves from one point to another, I employ the above-described pendulum as an accelerometer and velocity measuring device since it is displaced upon movement of the ship by an amount proportional to and in the opposite direction from the ship's acceleration which is resolved into N-S and E-W components because of the stabilization in azimuth of the pick-off by the gyro-compass repeater 37. I then provide means for integrating such signals so as to obtain a measure of the ship's velocity of movement and its direction and further secure a second integration through the gyro to obtain a term representing the change of position of the ship taking place.

The first integration may be obtained by means such as shown diagrammatically in Fig. 5. The output of the pick-off 70 is at first fed through a phase sensitive amplifier 50 and amplifier 51, the output of which controls a motor 52 whose speed is closely proportional to the magnitude of the signal, or, in other words, to the acceleration of the ship and whose direction of rotation changes with a reversed phase of the signal. The amount of rotation of the motor shaft will, therefore, be a measure of the ship's velocity resolved in the N-S direction.

To further increase the accuracy, I have shown an eddy current or speed generator 53 mounted on the shaft of the motor, the output of which is fed back into the system to oppose the output of the amplifier 50. The motor shaft also drives a large reduction gear train 54 which in turn drives a synchro transmitter 55, the output of which is a measure of the ship's velocity and actuates with or without amplification the proper poles 30', 31 of the torquer 30. The output of synchro 55 controls, through amplifier 61, a torquer 30 for applying a torque on the gyro about its appropriate horizontal axis proportional to the velocity of the ship in the N-S and E-W plane. It is to be understood that a similar integrating network is arranged for the other pair of poles 74, 74' of the cruciform pick-off 70 which responds to velocity in the E-W direction and ultimately controls windings 32, 33 on torquer 30 through a similar motor driven arrangement. Precession, therefore, of the gyro will be caused, which in amount is proportional to the change in position of the ship on the earth's surface due to such acceleration. Therefore, the resolved precessional movement of the gyro in the two planes, E-W and N-S, is representative of the change of position of the ship, and hence the gyroscope is moved to and is kept on the new true vertical, without oscillation, if it be given about an 84 minute period if properly damped.

It will also be observed that the same integrators correct for the change in direction of the vertical caused by the rotation of the earth, since the output of each pair of pickup coils 73, 73' and 74, 74' on the pendulum is always proportional to the error between the pendulum and the gyroscopically stabilized platform. This signal is therefore likewise integrated twice and hence will keep the gyroscope on the true vertical for any latitude provided the period of the gyro be kept at about 84 minutes. This can be readily arranged by adjusting the torquer gradients exerted by the torquer 30, on the gyroscope with respect to the gyroscopic moment of inertia, rotor speed and other constants. With this period, all acceleration errors such as due to roll and pitch of the ship, to change of speed or course, disappear, as can be shown both mathematically and experimentally. Also, by using this period, the change in direction of the vertical which occurs as the ship moves over the curved surface of the earth or as the earth rotates on its axis, can be brought about (smoothly and without setting up oscillations) by the time the ship arrives at its new latitude and longitude, or by the time the earth rotates through a given angle, so that the need for latitude setting as well as speed setting disappears.

In order to damp the slow oscillations of the gyro unit which would result from the system so far described, I may supply a portion of the amplified signal from each pair of pickups to the appropriate poles of the torquer 30 as represented by leads 101, 102 connecting this signal in series with the signal from synchro 55. By this means the setting of the gyroscope in its new position is hastened. Preferably, however, I keep this signal small since it may give rise to some error during changes of speed or course of the ship and also since the damping signal should play a secondary part as compared to the primary integrated signal. To further lessen such error, I may provide a short circuiting switch 60 to cut out such damping signal from amplifier 61 at such time.

Also, to hasten settling of the instrument when first starting up, I may provide a latitude setting knob 62 and dial 63 on each of the synchro transmitters 55 so that the device when started up may be brought more quickly to its correct position. Such device, however, is not necessary in my instrument, since, as stated, it will find the true vertical under all conditions of latitude, speed and course of the ship without the necessity for any manual settings of speed, course or latitude, and without any "stand-off" error.

Figure 6:
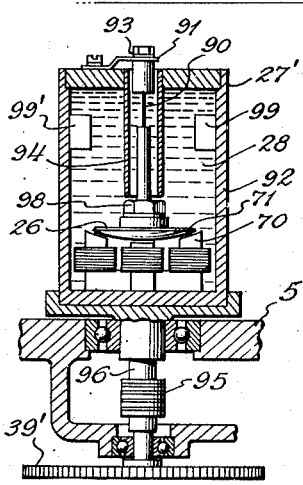
Fig. 6 is a vertical section of a modified form of pendulous controller which is more suited to use on vehicles subject to high acceleration forces, such as airplanes.

A modified form of pendulous or gravitational controller is shown in Fig. 6. This form likewise consists of a pendulum 26 and a five-fingered inductive pick-off 70, 71 immersed in a liquid 28 in a tube 27', as in Fig. 2. However, in this case the displacement of the pendulum is opposed not only by gravity, but by a spring support 90 consisting of a resilient but relatively stiff wire clamped at its top in a block 91 and its bottom in a rod 92 secured to the pendulum 26. By this means the displacement of the pendulum under the action of lateral acceleration forces is kept small even though the device be mounted on an airplane subject to large acceleration forces and also remains proportional to the magnitude of such forces, i. e., remains linear up to at least 1 g. By this means the displacement of the pendulum is kept within the pick-off range of the inductive pick-off 70. As before, the tube or housing 27' is maintained fixed in azimuth by being rotatably mounted on a platform 5 and being connected through gear 39' to a repeater compass. An inner smaller tube 94 is shown as surrounding the rod 92 on the pendulum to act as a limit stop against excessive oscillations. This tube also extends downwardly in close proximity to the top of the nut 98 on top of the pendulum. This construction serves as a stop or rest for the pendulum in case the airplane in which it is mounted is flying upside down to prevent buckling of the spring wire 90. For this purpose the block 91 is affixed at its top to a spring bracket 93, which yields sufficiently when the airplane is upside down to permit the nut 98 to rest on the bottom of the tube 94 without buckling the wire 90.

Since the viscosity of the liquid in the tube varies with temperature, I prefer to maintain the temperature constant as by means of a heater 99 and thermostat 99', which controls the heater. In the main form of the invention, a single thermostatically controlled heater 100 is shown within the enclosure 5' to maintain the same at a constant temperature and thereby maintain the liquids in casing 10 and tube 27 at constant temperatures. Slip rings 95 are provided on a shaft 96 mounting the housing 27' to lead in current to the inductive pick-off.

From the foregoing, the operation of my improved gyro vertical should be apparent. The gyro unit within its case 5' on platform 5 acts as a base line to stabilize the platform through concentric pick-offs 42, 43, the outputs of which actuate the servomotors 6 and 6' acting about the gimbal axes 2 and 4. Therefore, the gimbal unit, while stabilized against rolling and pitching, turns in azimuth with the ship and the horizontal position of the same will be transmitted to any point of the ship with respect to the ship's fore-and-aft and athwartship axes. However, the control of the gyroscope is effected by a gravitational means which is in effect referred to the meridian, that is, it is fixed in azimuth in order that the accelerations and motions of the ship may be resolved into geographical components, preferably N-S and E-W. This is effected without fixing in azimuth the entire gyro unit as follows: The pendulous controller is fixed in azimuth from a repeater compass and likewise the torquer 30 for the gyro is also so fixed, the torquer being preferably mounted in line with the vertical spin axis of the gyro so that relative turning in azimuth of the two parts of the pick-off will not give a false output. It is recognized that a similar effect could be accomplished as far as the torquer is concerned if the torquer turned with the ship by placing a meridian resolver between the controlling pendulum and the torquer which will resolve the N-S and E-W outputs of the pendulum into components along and across the ship's fore-and-aft line, as described in the aforesaid patent to Esval, 2,293,039. In my device, friction between the gyro and the ship is substantially eliminated by floating the sensitive element in a liquid without buoyancy and by rotating the gimbal support. By this means, by integrating the outputs of the pendulous controller and by employing such to torque the gyro about axes at right angles to the tilt, I have produced a successful 84-minute period gyro vertical which will seek the true vertical regardless of changes of latitude, speed or course of the vehicle on which it is mounted.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic artificial horizon for moving vehicles, a gyroscope having a gravity reference device adapted to generate proportional signals upon relative tilt of said device and gyroscope, a gimbal mounting for said gyroscope, control torquers for applying torques on the gyro about selected horizontal axes, integrating networks between said signals and torquers so designed as to give the gyro a natural period of about 85 minutes whereby the resulting precession of the gyroscope is proportional to the change in geographic position of the vehicle in the direction of such change, and means for floating said gyroscope to eliminate load on the gimbal bearings, and means for continuously orienting said gimbal mounting.

2. In a gyroscopic artificial horizon, a universally gimballed gyro vertical, having a substantially closed rotor casing, an outer enclosure therefor, a liquid between said casing and enclosure in which said casing is immersed, said liquid having a density such that it virtually supports the weight of the gimbal and said casing, and means for slowly continuously orienting said enclosure in azimuth to further lessen the error otherwise caused by shift in the center of gravity of said rotor and casing.

3. In a gyroscopic artificial horizon, a universally gimballed gyro vertical, having a substantially closed rotor casing, an outer enclosure therefor, a liquid between said casing and enclosure in which said casing is immersed and which virtually supports the weight of the gimbal and said casing and rotor, means for slowly rotating said enclosure about a vertical axis, a gimbal mounting for said enclosure, and means for stabilizing said enclosure from said gyro vertical including a pick-off between said casing and enclosure symmetrically positioned with respect to said vertical axis whereby the output thereof is unaffected by rotation of said enclosure.

4. In a gyroscopic horizon for vehicles, a stabilized platform universally gimballed on the vehicle, a gyro housing on said platform, a gyro vertical universally gimballed in said housing, a control pendulum universally pivoted on said platform, a pick-off for detecting relative tilt of said pendulum and platform in any direction, a torquer controlled thereby to exert torques on the gyro normal to such tilt, separate means mounting said pendulum and said torquer on said platform for freedom about a vertical axis, and compass controlled means for maintaining both said pick-off and torquer fixed in azimuth.

5. A gyroscopic horizon for vehicles, as claimed in claim 4, having a pick-off for detecting relative tilt of said gyro and platform, and servomotors controlled thereby for stabilizing said platform.

6. In a gyroscopic artificial horizon, a universally gimballed gyro vertical, having a substantially closed rotor casing, an outer enclosure therefor, a platform on which said enclosure is journaled for rotation about a vertical axis, a liquid between said casing and enclosure in which said casing is immersed, sad liquid having a density such that it supports the weight of the gimbal and said casing without buoyancy, means for slowly and continuously orienting said enclosure about said vertical axis, and other means on said platform for applying controlling torques to said gyroscope about a horizontal axis fixed in azimuth, said means being concentrically mounted along said vertical axis whereby torques applied by said torquer to said gyroscope are applied about the correct axis and are unaffected by the orientation thereof.

7. In a gyroscopic artificial horizon, a universally gimballed gyro vertical, having a closed rotor casing, an outer enclosure therefor, a platform on which said enclosure is journaled for freedom about a vertical axis, a gimbal universally mounting said casing in said enclosure, a liquid between said casing and enclosure in which said casing is immersed, said liquid having a density such that it virtually supports the weight of the gimbal and said casing without buoyancy, means for slowly rotating said enclosure about said vertical axis, other means on said platform for applying controlling torques to said gyroscope, said means being concentrically mounted along said vertical axis, said torquing means being rotatably mounted, and means maintaining said torquing means fixed in azimuth when the ship turns so that the torques applied thereby are with reference to the meridian and unaffected by rotation of said enclosure.

8. In a gyroscopic artificial horizon for moving craft, a gyro vertical having a substantially closed rotor casing, a universal gimbal mounting for said casing, an outer enclosure for said casing and its mounting, a platform on which said enclosure is journalled for freedom about a vertical axis, a liquid between said casing and enclosure in which said casing is immersed and which supports the weight of the gimbal mounting and said casing without buoyancy, means for slowly and continuously orienting said enclosure on said platform, a gimbal mounting for said platform, means for stabilizing said platform in its mounting from said gyro vertical about axes fixed on the craft, a second enclosure adapted to be filled with a liquid mounted on said platform, a pendulum pivoted in said second enclosure within a liquid, means for generating signals upon relative tilt of said platform and pendulum, and torquing means controlled by said signals and arranged to apply torques on the gyro vertical for maintaining the gyro vertical erect, said torquing means being unaffected by the continuous orientation of said outer enclosure.

9. In a gyroscopic artificial horizon, a gyro vertical having a substantially closed rotor casing, a universal gimbal mounting for said casing, an outer enclosure for said casing and its mounting, a platform on which said enclosure is journalled for freedom about a vertical axis, a liquid between said casing and enclosure in which said casing is immersed and which virtually supports the weight of the gimbal and said casing, means for slowly and continuously orienting said enclosure on said platform, a gimbal mounting for said platform, means for stabilizing said platform in its mounting from said gyro-vertical, a second enclosure adapted to be filled with a liquid and mounted on said platform, a pendulum pivoted in said second enclosure, means for generating signals upon relative tilt of said platform and pendulum, torquing means controlled by said signals for maintaining the gyro erect, and compass controlled means for maintaining at least said enclosure fixed in azimuth.

10. A gyroscopic artificial horizon as claimed in claim 8 having thermostatically controlled means for maintaining the liquid temperature around both the gyroscope and pendulum constant.

11. In a gyro vertical for ships or other vehicle, a gyroscope having a normally vertical spin axis, a housing therefor, a platform on which said housing is rotatably mounted about a vertical axis, an outer gimbal system universally mounting said platform on the ship, means for continuously rotating said housing on said platform, a gravity reference device also rotatably mounted on said platform, means for orienting said device to maintain it fixed in azimuth regardless of turning of the vehicle, pick-offs on said device for generating signals upon relative tilt of said platform and device proportional to and responsive to the plane of tilt, a normally horizontal gimbal universally mounting said gyroscope in said housing and having its center of oscillation in said vertical axis, control torquers in vertical alignment with said spin axis and controlled by said tilt signals, means for orienting said torquers to maintain them fixed in azimuth, integrating networks between said signals and torquers so designed as to give the gyroscope a natural period of about 85 minutes, pick-offs mounted on said platform in vertical alignment with said spin axis and generating signals upon relative tilt of said spin axis and said platform unaffected by the rotation of said platform, means controlled thereby for stabilizing said platform through said outer gimbal system against roll and pitch, and transmitters actuated from said gimbal system for stabilizing other instruments on the vehicle against roll and pitch.

References Cited in the file of this patent

UNITED STATES PATENTS

| 1,480,637 | Schuler | Jan. 15, 1924 |
| 1,845,592 | Fieux | Feb. 16, 1932 |
| 1,932,210 | Glitscher | Oct. 24, 1933 |
| 2,109,283 | Boykow | Feb. 22, 1938 |
| 2,293,039 | Esval | Aug. 18, 1942 |
| 2,411,087 | Ford et al. | Nov. 12, 1946 |
| 2,427,158 | Poitras et al. | Sept. 9, 1947 |
| 2,533,217 | Braddon | Dec. 12, 1950 |
| 2,577,942 | Agins | Dec. 11, 1951 |
| 2,600,476 | Bursack | June 17, 1952 |
| 2,618,159 | Johnson et al. | Nov. 18, 1952 |
| 2,620,669 | Braddon | Dec. 9, 1952 |
| 2,677,194 | Bishop | May 4, 1954 |

FOREIGN PATENTS

| 640,562 | Great Britain | July 26, 1950 |
| 656,889 | Great Britain | Sept. 5, 1951 |